United States Patent
Tu et al.

(10) Patent No.: US 8,792,476 B2
(45) Date of Patent: Jul. 29, 2014

(54) METHODS, APPARATUSES, AND COMPUTER PROGRAM PRODUCTS FOR PROCESSING SESSION RELATED PROTOCOL SIGNALING MESSAGES

(75) Inventors: Fangqiu Tu, Caldwell, NJ (US); Ben-Ren Chen, Northborough, MA (US)

(73) Assignee: Cellco Partnership, Basking Ridge, NJ (US)

( * ) Notice: Subject to any disclaimer, the term of this patent is extended or adjusted under 35 U.S.C. 154(b) by 1840 days.

(21) Appl. No.: 11/687,134

(22) Filed: Mar. 16, 2007

(65) Prior Publication Data
US 2008/0225831 A1 Sep. 18, 2008

(51) Int. Cl.
*H04L 12/66* (2006.01)
*G06F 15/16* (2006.01)
*H04B 7/00* (2006.01)

(52) U.S. Cl.
USPC ........... 370/352; 709/247; 709/206; 709/227; 455/518

(58) Field of Classification Search
USPC ........ 370/352; 455/518, 519, 414.1; 709/206, 709/227
See application file for complete search history.

(56) References Cited

U.S. PATENT DOCUMENTS

| | | | | |
|---|---|---|---|---|
| 7,417,943 B2* | 8/2008 | Mutch | | 370/202 |
| 8,195,212 B2* | 6/2012 | Akhtar et al. | | 455/518 |
| 2002/0191593 A1* | 12/2002 | O'Neill et al. | | 370/352 |
| 2003/0120813 A1* | 6/2003 | Majumdar et al. | | 709/247 |
| 2003/0233478 A1* | 12/2003 | Chuah et al. | | 709/247 |
| 2004/0147247 A1* | 7/2004 | Demetrescu et al. | | 455/412.1 |
| 2004/0162032 A1* | 8/2004 | Li et al. | | 455/72 |
| 2006/0183491 A1* | 8/2006 | Gundu et al. | | 455/518 |
| 2006/0274661 A1* | 12/2006 | Drum et al. | | 370/241 |
| 2007/0049314 A1* | 3/2007 | Balachandran et al. | | 455/518 |

FOREIGN PATENT DOCUMENTS

| | | |
|---|---|---|
| EP | 1 376 878 A1 | 1/2004 |
| WO | WO 2006/050182 A2 | 5/2006 |

OTHER PUBLICATIONS

Price et al., "Signaling Compression (SigComp)"; rfc3320.txt; IETF Standard, Internet Engineering Taskforce, Jan. 2003; pp. 1-62.*
Hannu et al., "Signaling Compression (SigComp)—Extended Operations"; rfc3321.txt; IETF Standard, Internet Engineering Taskforce, Jan. 2003; pp. 1-19.*
Garcia-Martin et al., "The Session Initiation Protocol (SIP) and Session Description Protocol (SDP) Static Dictionary for Signaling Compression (SigComp)"; rfc3485.txt; IETF STandard, Internet Engineering Taskforce, Feb. 2003; pp. 1-30.*

* cited by examiner

*Primary Examiner* — Nicholas Jensen (57) ABSTRACT

An apparatus for processing session related protocol signaling messages includes a simplification element. The simplification element may be configured to receive a message associated with a session related protocol, to determine whether the message is a per call based message and, in response to a determination that the message is the per call based message, to interpret the per call based message without the removed per session based information. The per call based message is free of per session based information that has been removed.

11 Claims, 7 Drawing Sheets

```
REGISTER tel:9084774398 SIP/3.C
t:
i: 571441171:1665.898000@69.98.255.33
Cseq: 1
4
v: 69.98.255.33
x:
min=9085771952;sid=0016;bv=0;gv=0;hsbi=1;ps=1
o=Winphoria 2300 0 IN IP4 69.98.255.33:60
```

FIG. 4A.

```
INVITE tel:9084774398 SIP/3.C
f: <tel:9084774398>;tag=463424046
t:
i: 907420959:42.213000@69.98.255.33
Cseq: 1
v: 69.98.255.33
4
l
X:sid=0016;fc=x-Motorola/1;
o=Winphoria 2300 0 IN IP4 69.98.255.33:60
```

FIG. 4B.

```
INVITE tel:9084774398
f: <tel:9084774398>;tag=463424046
Cseq: 1
v: 69.98.255.33
l
```

FIG. 4C.

```
BSIP

INVITE
tel:9083702876
f: <tel:9084774398>
tag=463424046
Cseq: 1
I
v: 69.98.255.33
```

METHODS, APPARATUSES, AND COMPUTER PROGRAM PRODUCTS FOR PROCESSING SESSION RELATED PROTOCOL SIGNALING MESSAGES

TECHNOLOGICAL FIELD

Embodiments of the present invention relate generally to session related communication, and, more particularly, relate to methods, apparatuses, and computer program products for processing session related protocol signaling messages.

BACKGROUND

Given the ubiquitous nature of mobile electronic devices such as, for example, mobile communication devices like cellular telephones, many people are utilizing an expanding variety of applications that are executable at such mobile electronic devices. For example, applications for providing services related to communications, media sharing, information gathering, education, gaming, and many others have been developed, fueled by consumer demand. One particular area in which consumer demand has triggered an expansion of services relates to the establishment of communication sessions during which, for example, Internet telephone calls, multimedia distribution, multimedia conferences and the like may be established. Examples of protocols which may be used in such communication sessions may include, for example, Session Initiation Protocol (SIP), Motorola Push-to-Talk (M-PTT) protocol, and the like.

SIP is an application-layer control (signaling) protocol for creating, modifying, and terminating sessions with one or more participants. SIP is widely used as a signaling protocol for Voice over Internet Protocol (VoIP) and media sharing applications. SIP is addressing neutral, with addresses expressed as a uniform resource locator (URL), a uniform resource identifier (URI), a telephone number, an email like address, or the like. SIP is generally considered to be lightweight since it has a limited number of methods to reduce complexity, and transport-independent since it can be used with User Datagram Protocol (UDP), Transport Control Protocol (TCP) and other transport protocols.

SIP clients may use, for example, TCP or UDP to connect to a SIP server and/or other SIP endpoints. As such, SIP may be used in setting up and tearing down voice or video calls or in any application where session initiation is employed. SIP, therefore, provides a signaling and call setup protocol for IP-based communications that can support a superset of call processing functions and features present in the public switched telephone network (PSTN).

SIP is a peer-to-peer protocol which works in concert with several other protocols and is typically only involved in the signaling portion of a communication session. SIP invitations are used to create sessions and SIP signaling is used to carry session descriptions that allow participants to agree on a set of compatible media types. SIP servers, or proxy servers, may help route requests to users, implement provider call-routing policies, provide features to users, etc. SIP also provides a registration function to allow users to upload their current locations to the proxy server.

M-PTT protocol is an example of a SIP based protocol which may be employed for session based communications such as push-to-talk (PTT) communications. M-PTT signaling messages are text based messages which may be used to set up calls from one network node (e.g., a mobile terminal such as a mobile phone) to another. For example, M-PTT or another session based protocol may be used to set up a PTT call between two network nodes that have subscribed to a PTT service. Since M-PTT signaling messages are text based, commercially available cellular applications using M-PTT protocol for signaling may encode the M-PTT signaling messages in UTF-8 format before transmitting the messages to their respective destinations. UTF-8 is a variable-length character encoding scheme developed for Unicode. UTF-8 may represent any universal character in the Unicode standard, yet its initial encoding of byte codes and character assignments is coincident with ASCII. UTF-8 uses one to four bytes per character, depending on the Unicode symbol.

In order to enable establishment of, for example, a PTT call, an initiating node in a communication system such as a code division multiple access (CDMA) system may send signaling messages over a radio frequency (RF) channel attempting to establish the PTT call. Using encoding commonly employed today, such as UTF-8 encoding, session related protocol signaling messages may be considered bulky with respect to the RF channel's bandwidth capacity. For example, M-PTT signaling messages are often about 250 bytes. Thus, assuming a typical data rate of an RF channel of about 9.6 kilobytes per second (kbps), it may take 200 ms to transmit a single M-PTT protocol signaling message. Given that there are typically many such messages being communicated between a server and its associated clients, delays may be experienced which may negatively impact real-time sensitive applications such as VoIP, PTT, video telephony, video instant messaging and the like.

Accordingly, it may be desirable to provide a mechanism by which to address at least some of the problems described above.

BRIEF SUMMARY

Methods, apparatuses and computer program products are therefore provided for processing session related protocol signaling messages such as by simplifying and/or encoding the messages. In particular, a method, apparatus and computer program product are provided that may enable a reduction in the size of session related protocol signaling messages. Furthermore, binary encoding of session related protocol signaling messages is also provided, which may enable a further reduction in a size of session related protocol signaling messages. In an exemplary embodiment, the reduction in size of session related protocol signaling messages may at least in part be accomplished by eliminating per session based information from per call based messages.

In one exemplary embodiment, a method for processing of session related protocol signaling messages is provided. The method may include receiving a message associated with a session related protocol, determining whether the message is a per call based message, and, in response to a determination that the message is the per call based message, removing at least some per session based information from the per call based message.

In another exemplary embodiment, a computer program product for processing of session related protocol signaling messages is provided. The computer program product includes at least one computer-readable storage medium having computer-readable program code portions stored therein. The computer-readable program code portions may include first, second and third executable portions. The first executable portion is for receiving a message associated with a session related protocol. The second executable portion is for determining whether the message is a per call based message. The third executable portion is for, in response to a determination that the message is the per call based message, removing at least some per session based information from the per call based message.

In another exemplary embodiment, an apparatus for processing of session related protocol signaling messages is provided. The apparatus may include a simplification element. The simplification element may be configured to receive a message associated with a session related protocol, to determine whether the message is a per call based message and, in response to a determination that the message is the per call based message, remove at least some per session based information from the per call based message.

In one exemplary embodiment, a method for processing of session related protocol signaling messages is provided. The method may include receiving a message associated with a session related protocol, determining whether the message is a per call based message, and, in response to a determination that the message is the per call based message, interpreting the per call based message without the removed per session based information. The per call based message may be free of per session based information that has been removed.

In another exemplary embodiment, a computer program product for processing of session related protocol signaling messages is provided. The computer program product includes at least one computer-readable storage medium having computer-readable program code portions stored therein. The computer-readable program code portions may include first, second and third executable portions. The first executable portion is for receiving a message associated with a session related protocol. The second executable portion is for determining whether the message is a per call based message. The third executable portion is for in response to a determination that the message is the per call based message, interpreting the per call based message without the removed per session based information. The per call based message may be free of per session based information that has been removed.

In another exemplary embodiment, an apparatus for processing of session related protocol signaling messages is provided. The apparatus may include a simplification element. The simplification element may be configured to receive a message associated with a session related protocol, to determine whether the message is a per call based message and, in response to a determination that the message is the per call based message, interpret the per call based message without the removed per session based information. The per call based message may be free of per session based information that has been removed.

Embodiments of the invention may provide a method, apparatus and computer program product for simplifying and/or encoding of session related protocol signaling messages to reduce message size. As a result, for example, delays in processing session related protocol signaling messages may be reduced and user experience may be enhanced.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Exemplary embodiments are described hereinafter with reference to the accompanying drawings, in which exemplary embodiments and examples are shown. Like numbers refer to like elements throughout.

One or more embodiments may be implemented as a method, a device, or a computer program product. Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

In certain embodiments referenced herein, a "computer" or "computing device" may be described. Such a computer may be, for example, a mainframe, server, desktop, laptop, or a hand held device such as a data acquisition and storage device, or it may be a processing device embodied within another apparatus such as, for example, a set top box for a television system or a wireless telephone. In some instances the computer may be a "dumb" terminal used to access data or processors over a network.

In certain embodiments referenced herein, a "network" or "network system" may be referenced. Such a network may be considered for example, a personal area network (PAN), a local area network (LAN), a wide area network (WAN), the Internet, etc. Such networks may include one or more devices, such as computers and peripheral devices. The networks may be configured to communicate with one or more external devices, systems, networks, or other sources through one or more interfaces. More specifically, one or more of the computers or peripheral devices may be configured to receive and/or transmit information to or through an external device, system, network, or other external source.

Figure 1:
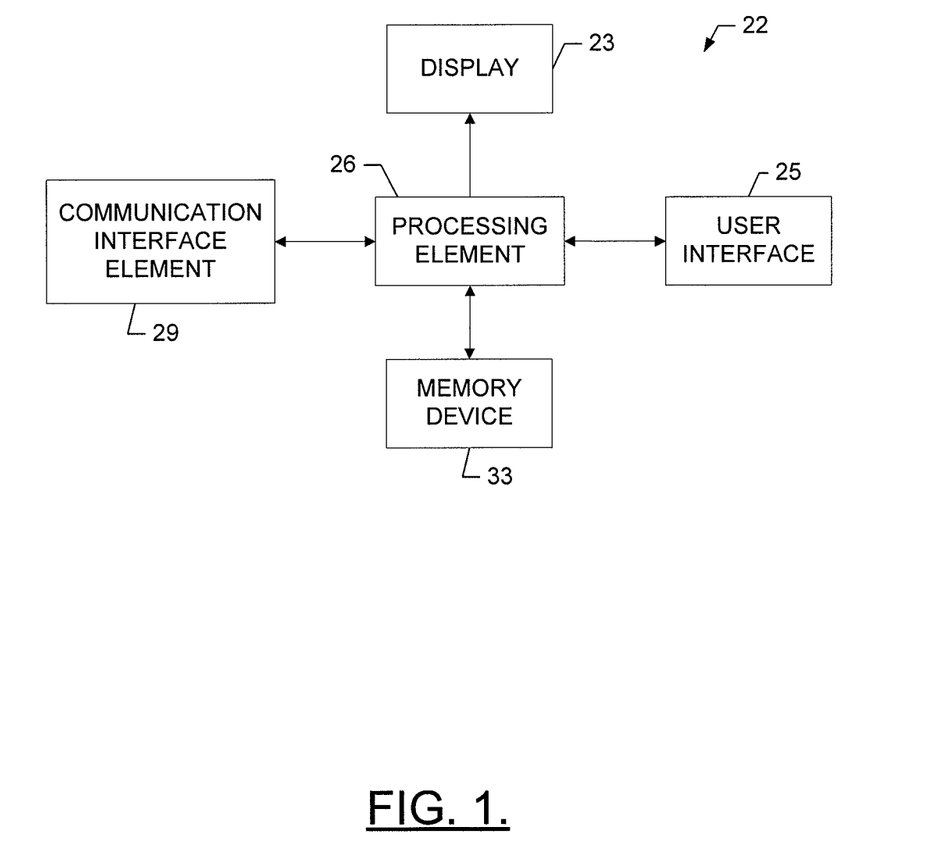
FIG. 1 is a schematic block diagram of a mobile terminal according to an exemplary embodiment of the present invention.

FIG. 1 is a schematic block diagram of a mobile terminal or network component (e.g., a network node) which may act as a client device according to an exemplary embodiment of the present invention. It should be understood, however, that a mobile terminal as illustrated and hereinafter described is merely illustrative of one type of apparatus that would benefit from embodiments of the present invention and, therefore, should not be taken to limit the scope of embodiments of the present invention. Types of mobile terminals which may employ embodiments of the present invention include but are not limited to devices such as portable digital assistants (PDAs), pagers, mobile televisions, gaming devices, music players, laptop computers, mobile telephones and other types of audio, voice and text communications systems. In addition to mobile devices, fixed devices may also employ embodiments of the present invention.

As shown in FIG. 1, in addition to a display 23 (which may be omitted for certain network components) and user interface 25, a mobile terminal 22 may include a processing element 26, a communication interface element 29 and a memory device 33. The memory device 33 may include, for example, volatile or non-volatile memory. The memory device 33 may be configured to store information, data, applications, instructions or the like for enabling the mobile terminal 22 to carry out various functions in accordance with exemplary embodiments of the present invention. For example, the memory device 33 could be configured to store an application for enabling communication with other users via a session such as a Session Initiation Protocol (SIP) session, a push-to-talk (PTT) communication session or the like. Additionally or alternatively, the memory device 33 could be configured to store other data including, for example, multimedia content for communication or sharing with other terminals.

The processing element 26 may be embodied in many ways. For example, the processing element 26 may be embodied as a processor, a coprocessor, a controller or various other processing means or devices including integrated circuits such as, for example, an ASIC (application specific integrated circuit). In an exemplary embodiment, the processing element 26 may be configured to execute instructions stored in the memory device 33 or otherwise accessible to the processing element 26. In an exemplary embodiment, the processing element 26 may be configured to execute a communication session establishment application and/or a content sharing application stored in the memory device 33 or otherwise accessible to the processing element 26. Meanwhile, the communication interface element 29 may be embodied as any device or means embodied in either hardware, software, or a combination of hardware and software that is configured to receive and/or transmit data from and/or to a network.

The communication interface element 29 may include an antenna or multiple antennae in operable communication with a transmitter and/or a receiver. Accordingly, the mobile terminal 22 may be configured to communicate signals that may include signaling information in accordance with an air interface standard of an applicable cellular system, and also user speech and/or user generated data. As such, the mobile terminal 22 may be capable of operating with one or more air interface standards, communication protocols, modulation types, and access types.

The display 23 may be, for example, a conventional LCD (liquid crystal display) or any other suitable display known in the art upon which images may be rendered. The user interface 25 may include, for example, a keyboard, keypad, joystick, function keys, mouse, scrolling device, touch screen, or any other mechanism or input device by which a user may interface with the mobile terminal 22.

Figure 2:
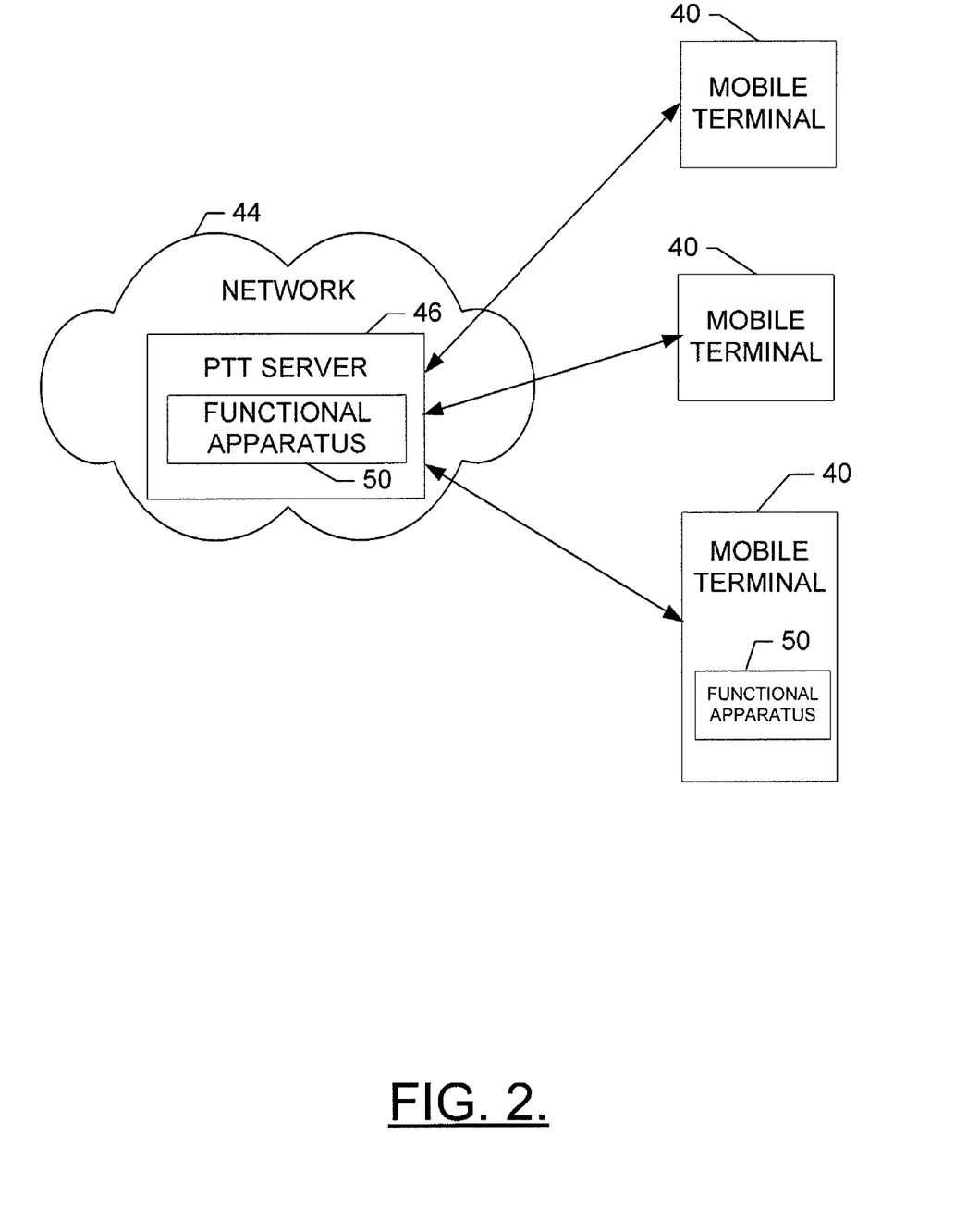
FIG. 2 is a schematic block diagram of a wireless communications system for establishing a communication session according to an exemplary embodiment of the present invention.

FIG. 2 is a schematic block diagram of a wireless communications system for establishing a communication session according to an exemplary embodiment of the present invention. In an exemplary embodiment, the system of FIG. 2 may be capable of facilitating communications in accordance with SIP (e.g., establishing a SIP session) and/or M-PTT (e.g., establishing a PTT call) although other communication protocols and communication sessions may also be utilized. As such, FIG. 2 is a simplified schematic diagram illustrating a system capable of supporting communication between network nodes such as mobile terminals 40. For example, SIP, M-PTT or the like, may be utilized to establish communication between the mobile terminals such as via a session which may be provided in connection with SIP, PTT or the like over a network 44. In this regard, it should be noted that the network 44 may include any combination of wireless or wired networks such as, for example, private networks, cellular networks, public networks, etc. The network 44 may include at least one service related server. Although a PTT service will primarily be described below for purposes of example, other types of services could also be utilized in connection with embodiments of the present invention such as, for example, voice over IP, video telephony, video instant messaging and the like.

In an exemplary embodiment in which PTT communications are supported, the server may be a PTT server 46, which may be associated with, for example, the network nodes which have subscribed to a PTT service which may be provided over the network 44. The PTT server 46 may be capable of receiving and forwarding SIP and/or PTT signaling messages and/or messages from another protocol used for session/call setup. In an exemplary embodiment, the PTT server 46 may be a server or other computing device configured to enable communication of messages, such as SIP and/or PTT signaling messages, to and/or from the mobile terminals 40. As such, the PTT server 46 may also include elements similar to those of the mobile terminal 22 described in reference to FIG. 1, except that the PTT server 46 may not include the display 23. Although signals may be described hereinafter as passing between the mobile terminals 40, it should be understood that such signals are communicated via the network 44 and also via the PTT server 46 where applicable. It should also be understood that the mobile terminals 40 may be examples of the mobile terminal 22 of FIG. 1, or any other suitable communications device.

Figure 3:
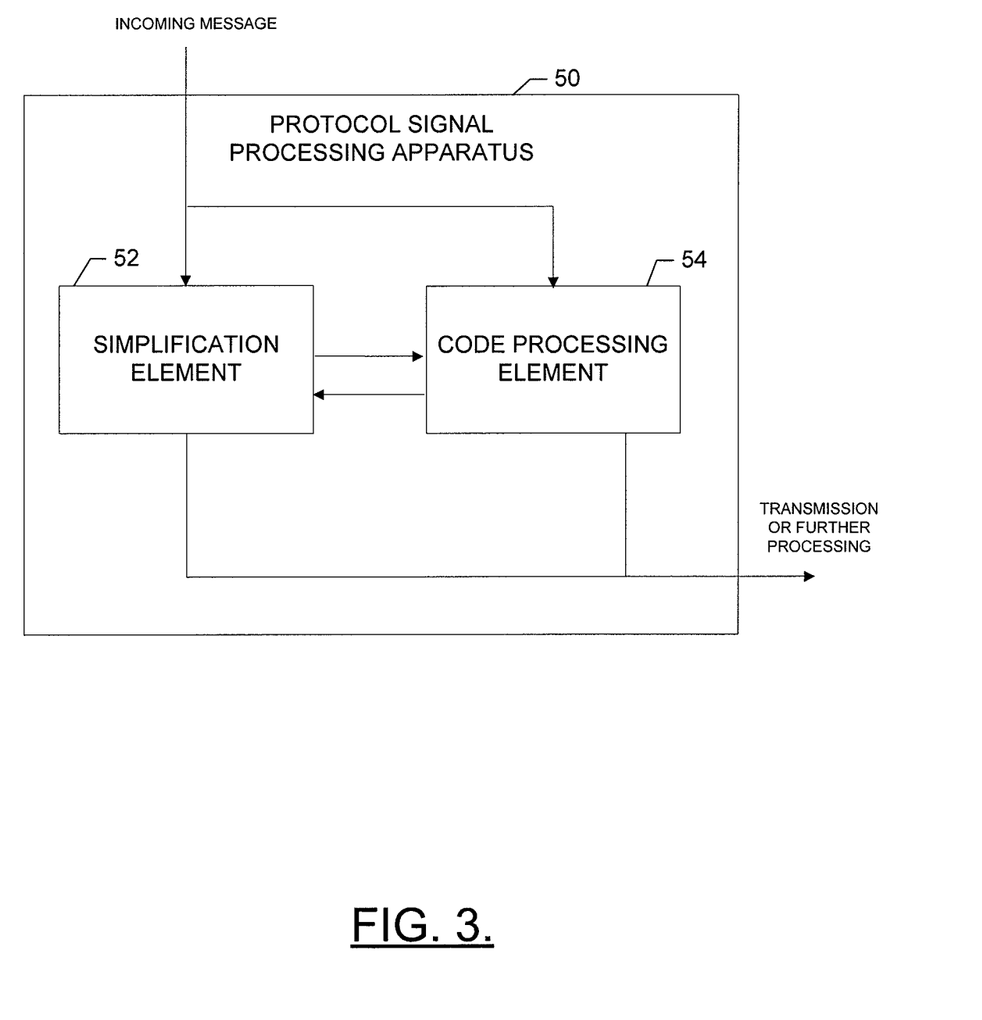
FIG. 3 illustrates a block diagram of a functional apparatus according to an exemplary embodiment of the present invention.

In an exemplary embodiment, as shown in FIG. 2, the PTT server 46 and/or one or more of the mobile terminals 40 may include a protocol signaling processing apparatus 50 configured to enable simplifying and/or encoding of session related protocol signaling messages such as, for example, M-PTT signaling messages. FIG. 3 illustrates a block diagram of the protocol signaling processing apparatus 50 according to an exemplary embodiment of the present invention. The protocol signaling processing apparatus 50 may be embodied as any device or means embodied in either hardware, software, or a combination of hardware and software that is configured to simplify and/or encode session related protocol signaling messages prior to transmission of such messages and/or decode and to interpret received session related protocol signaling messages that have previously been encoded and simplified in accordance with embodiments of the present invention. The protocol signaling processing apparatus 50 may be embodied as or operate under the control of a processor such as the processing element 26.

As shown in FIG. 3, for example, the protocol signaling processing apparatus 50 may include a simplification element 52 and a code processing element 54. The simplification element 52 and the code processing element 54 may each be embodied as any device or means embodied in either hardware, software, or a combination of hardware and software that is configured to execute the functions of the simplification element 52 and the code processing element 54, respectively, as described in greater detail below. The simplification element 52 and the code processing element 54 may each be embodied as or operate under the control of a processor such as the processing element 26.

In an exemplary embodiment, the simplification element 52 may be configured to determine a type of protocol signaling message that is received or that is to be transmitted. In this regard, the determination with respect to the type of protocol signaling message refers to making a determination as to whether the protocol signaling message that is received or that is to be transmitted corresponds to a per session based message or a per call based message.

Per session based messages may be defined as messages used for the establishment of a session. Session setup may occur, for example, following power up of a mobile terminal. Per session based messages may be utilized to exchange per session based information regarding service capabilities between, for example, the mobile terminals 40 and the PTT server 46. In this regard, during session setup, the per session based information may be extracted from the per session based messages and stored, for example, at the PTT server 46 (or other server if services other than PTT are involved). Using M-PTT as an example, per session based messages may include messages such as REGISTER, 200, 403, 420, 421, 480 and 500 messages. Per call based messages may be defined as messages used for establishing a call. Using M-PTT again as an example, per call based messages may include messages such as INVITE, NOTIFY, SUBSCRIBE, ACK, CANCEL, INFO, BYE and certain status messages such as 100 (TRYING), 180 (RINGING), 200 (OK), 403, 420, 480 and 500 messages.

In some session related protocols, such as the M-PTT protocol, per call based messages may include both per session based information and per call based information. As stated above, however, the per session based information is extracted and stored such that inclusion of per session based information in per call based messages is redundant. Thus, the ability of the simplification element 52 to determine whether a protocol signaling message is a per call based message or a per session based message may enable the simplification element 52 to identify per call based messages so that redundant information (e.g., per session based information) may be removed from the per call based messages to reduce message size. For example, if per call based message includes both per session based information and per call based information, at least some of the per session based information may be deleted thereby reducing message size. It is notable that, since the per session based information has previously been extracted and stored, no information will be lost by deleting at least some of the per session based information from the per call based message.

Figure 4A:
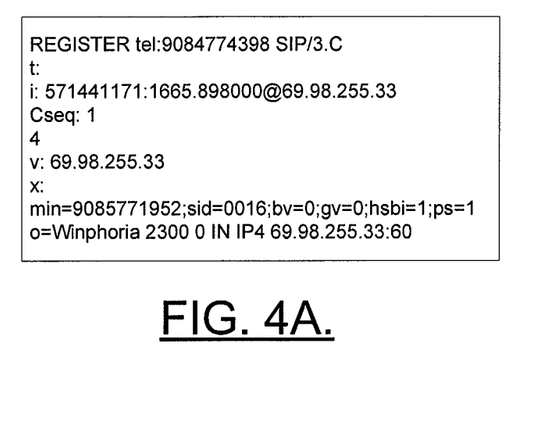
FIG. 4A illustrates an example of a per session based message.
Figure 4B:
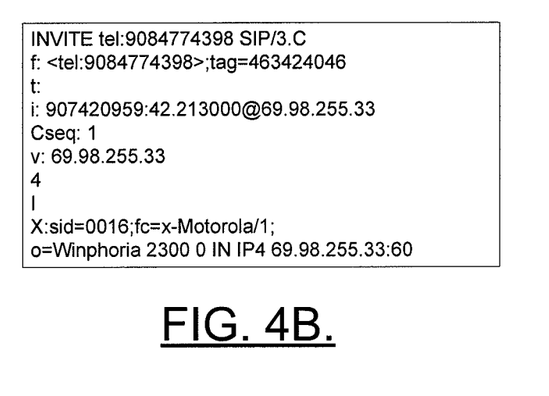
FIG. 4B illustrates an example of a per call based message prior to simplification in accordance with an exemplary embodiment of the present invention.

FIG. 4A illustrates an example of a per session based message. In this regard, FIG. 4A illustrates a REGISTER message for an M-PTT protocol signaling message. FIG. 4B illustrates an example of a corresponding per call based message. Although M-PTT is SIP based, M-PTT does not require certain tags which are included in SIP signaling messages and therefore may be redundant in certain M-PTT signaling messages. For example, certain redundant SIP tags may be removed from per call based messages such as the INVITE message shown in FIG. 4B. Redundant information (e.g., per session based information within the per call based message) may include a field from a per call based message that indicates a version of the session based protocol utilized in connection with the signaling message and/or whether or not the signaling message is a compressed version. For example, "SIP/X.C" may represent a field indicating a SIP version number "X" (e.g., version 3 in FIGS. 4A and 4B), and indicating (e.g., via the "C") that the version is a compressed version (e.g., M-PTT protocol). Other redundant information may include, for example, the M-PTT version number (e.g., "4"), the system ID ("sid") in which the "sid" value identifies the system ID with which a mobile terminal acquires a cellular service, and owner information ("o="). The owner information may be presented in the format "o=Winphoria xxxx y IN IP4 aa.bb.cc.dd:zz", in which xxxx represents the RTP port listened to by the mobile terminal, y represents the network version, aa.bb.cc.dd represents the IP address of the mobile terminal, and zz represents the type of vocoder used by the mobile terminal. Other unnecessary tags may also be removed such as the "i" tag and the "t" tag. The "i" tag, which in FIG. 4B is expressed in the form "i: xxxxxxxxx.yy.zzzzzz@aa.bb.cc.dd" may represent a unique identifier from the SIP protocol. The value xxxxxxxxx-.yy.zzzzzz represents a randomly generated number which is unique to the call, and aa.bb.cc.dd is the IP address of the mobile terminal. The "t" tag may be equivalent to the "TO" tag in the SIP protocol. Additionally, per session based information such as "fc=x-Motorola/x" may be removed from per call based messages and moved to per session based messages. The value "fc" may represent an RTP floor control feature and 'x' may represent whether the floor control feature is on or off.

Figure 4C:
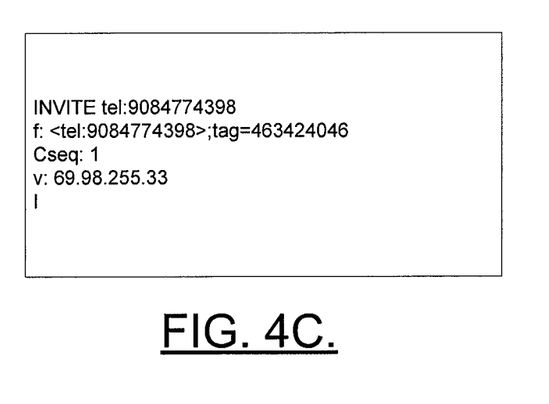
FIG. 4C illustrates an example of the per call based message of FIG. 4B following simplification in accordance with an exemplary embodiment of the present invention.

In an exemplary embodiment of the present invention, the simplification element 52 may be configured to identify message types (e.g., per call based messages) from which redundant information may be removed. FIG. 4C illustrates the per call based message of FIG. 4B following simplification by the simplification element 52 according to an exemplary embodiment of the present invention. As shown in FIG. 4C, the redundant information (e.g., the per session based information from the per call based message of FIG. 4B) has been removed. Accordingly, although the unsimplified per call based message of FIG. 4B was about 200 characters in length, the simplified per call based message of FIG. 4C includes about 80 characters, thereby causing a reduction of about 2.5:1.

Accordingly, as described above, the simplification element 52 may be configured to remove per session based information from per call based messages to cause a reduction in size for per call based messages. In addition, the simplification element 52 may also be configured to process messages of reduced size which may be received from devices employing an embodiment of the simplification element 52 to reduce the size of per call based messages. In this regard, the simplification element 52 may be configured to interpret received per call based messages despite the removal of per session based information from the per call based messages.

The code processing element 54 may be configured to binary encode a message prior to transmission and/or decode a binary encoded message received at the protocol signaling processing apparatus 50. The code processing element 54 may be configured to perform encode/decode operations in addition to or instead of the message simplification processes performed by the simplification element 52 as described above. In an exemplary embodiment, the code processing element 54 may be configured to perform coding operations (e.g., encoding/decoding) on per call and per session based messages such as, for example, M-PTT messages including REGISTER, INVITE, NOTIFY, SUBSCRIBE, ACK, CANCEL, INFO, BYE and certain status messages such as 100 (TRYING), 180 (RINGING), 200 (OK), 403, 420, 480 and 500 messages.

As stated above, session related protocol signaling messages may initially be encoded using UTF-8. As such, the code processing element 54 may be configured to parse UTF-8 encoded messages. The code processing element 54 may then be configured to binary encode the call related protocol signaling messages into a sequence of binary encoded characters having an initial special character string encoded in UTF-8. The special character string may represent a prefix indicating, in UTF-8, that the remainder of the session related protocol signaling message is binary encoded so that the code processing element 54 may switch to binary decoding after decoding the special character string. Accordingly, a session related protocol signaling message that is binary encoded according to embodiments of the present invention may be received by the code processing element 54 of a receiving device such as a network node (e.g., a mobile terminal or server) and initially parsed in UTF-8 to decode the special character string. Having decoded the special character string in UTF-8, the network node may then switch to decoding the binary encoded remainder of the session related protocol signaling message as directed by the special character sting.

Encoding and/or decoding of a session related protocol signaling message according to an embodiment of the present invention may include the use of a message field structure. In this regard, for example, a message field structure may include a plurality of fields. A first field of the message structure may encode the special character string in UTF-8 as described above. In an exemplary embodiment, the first field may be configured to define the special character string to be alpha-numerical characters having a string length of four to eight characters positioned to ensure that the special character string coincides with the beginning of a corresponding M-PTT message. A second field of the message structure may be a message length field indicating a length or size of the entire message in octets. The entire size may include the special character string and the remainder of the message. The length of the message length field may be implementation dependent. For example, a length field of one byte may be sufficient to represent any message length from 1 byte to 255 bytes. A third field of the message structure may be a message type field of one byte in length since a single byte may be used to define the message type. For example, using hexadecimal, each specific protocol signaling message could be described by a unique associated hexadecimal number (e.g., REGISTER—0x01, INVITE—0x02, NOTIFY—0x03, SUBSCRIBE—0x04, etc.). After the third field, other fields may be included, each of which may be message specific. In an exemplary embodiment, as described above, tag names (e.g., tel:, f:, etc.) may not be included in the encoded message. Accordingly, the code processing element 54 may be configured to use octet position to identify a beginning of encoded contents for each corresponding tag. In other words, based on an octets position within an encoded message, the code processing element 54 may be configured to determine to which tag the octet corresponds.

Figure 5A:
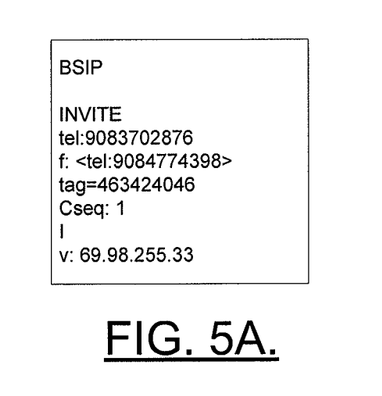
FIG. 5A illustrates an example of an M-PTT INVITE message prior to processing by a code processing element according to an exemplary embodiment of the present invention.
Figure 5B:
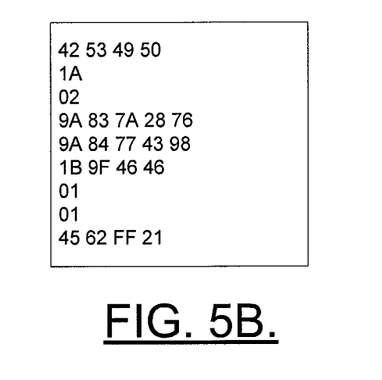
FIG. 5B illustrates an example of the message of FIG. 5A after processing by the code processing element according to an exemplary embodiment of the present invention.

FIG. 5A illustrates an example of an M-PTT INVITE message prior to processing by the code processing element 54. FIG. 5B illustrates an example of the message of FIG. 5A after processing by the code processing element 54 according to an exemplary embodiment of the present invention. In an exemplary embodiment, as shown in FIG. 5B, the mobile directory number (MDN) for the "tel" tag may be encoded as one hexadecimal digit for each decimal digit (e.g., 0—0xA, 1—0x1, 2—0x2, 3—0x3, 4—0x4, 5—0x5, 6—0x6, 7—0x7, 8—0x8, and 9—0x9). The sequence number from the "Cseq" tag may be encoded as binary digits using one byte. The call type (below the "Cseq" tag in FIG. 5A) may be encoded as binary digits using one byte (e.g., I—0x1, G—0x2, A—0x3). An IP address in the form aa.bb.cc.dd may be encoded as consecutive hexadecimal digits of four bytes. For example, the IP address 69.98.255.33 of FIG. 5A may be encoded as hexadecimal digits 4562FF21 shown in FIG. 5B. As shown in FIGS. 5A and 5B, encoding an INVITE message according to an embodiment of the present invention may result in a reduction from an 86 byte UTF-8 encoded message to a 26 byte binary encoded message (e.g., a compression ratio of about 3.3:1).

Figure 6:
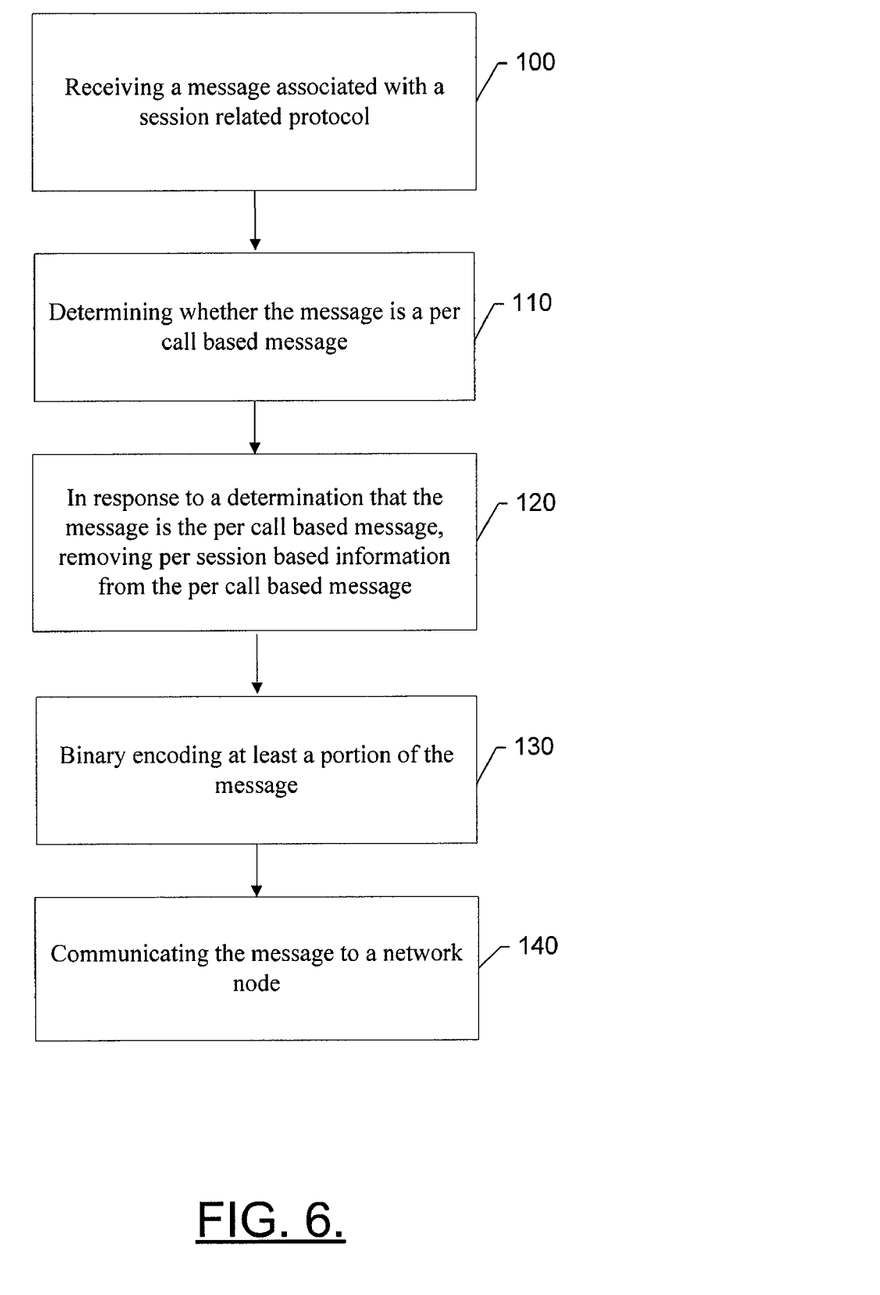
FIG. 6 is a flowchart according to an exemplary method and program product for processing of session related protocol signaling messages according to an exemplary embodiment of the present invention.
Figure 7:
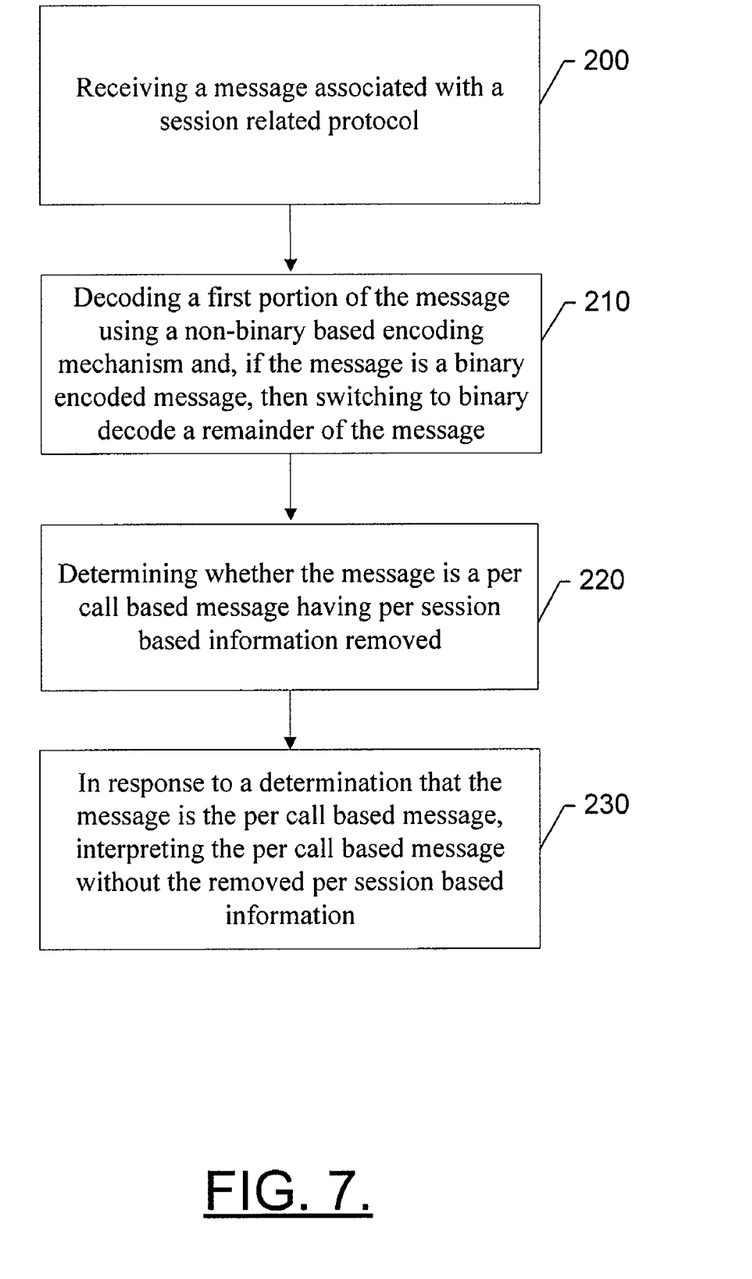
FIG. 7 is a flowchart according to another exemplary method and program product for processing of session related protocol signaling messages according to an exemplary embodiment of the present invention.

FIGS. 6 and 7 are flowcharts according to exemplary methods and program products for processing session related protocol signaling messages according to an exemplary embodiment of the present invention. As will be appreciated, for example, computer program instructions may be loaded onto a computer or other programmable apparatus (i.e., hardware) to produce a machine, such that instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

In this regard, one embodiment of a method of providing authentication of subscriber communications at a network node, as shown in FIG. 6, may include receiving a message associated with a session related protocol at operation 100. At operation 110, a determination may be made as to whether the message is a per call based message. In response to a determination that the message is the per call based message, at least some per session based information may be removed from the per call based message at operation 120. In this regard, simplification of messages may be accomplished by removing a predefined set of fields that are session based instead of call based. Removal of the predefined set of fields may be accomplished by identifying and removing at least some fields found to include per session based information within per call based messages. In an exemplary embodiment, the message received may be associated with a push-to-talk service. The method may further include binary encoding at least a portion of the message at operation 130 and communicating the message to a network node at operation 140. In an exemplary embodiment, a first portion of the message may be encoded using a non-binary based encoding mechanism indicating that a remainder of the message is binary encoded. The remainder of the message may then be binary encoded. In an exemplary embodiment, the first portion of the message may be encoded using an ASCII based encoding mechanism such as UTF-8.

In the context of the method illustrated in FIG. 6, which may be performed at a transmitting device, it should be understood that receiving does not imply the message has been transmitted by another device. Rather, receiving in the context of the method of FIG. 6 refers to receipt of a message during processing of the message prior to transmission. Thus, the message may be received from another element within the transmitting device and further processed prior to transmission.

Another embodiment of a method of providing authentication of subscriber communications at a network server, as shown in FIG. 7, may include receiving a message associated with a session related protocol at operation 200. The method of FIG. 7 may correspond to a network node, and thus receiving as used in the context of FIG. 7 may imply receipt of the message from a different device. The message received may include a first portion of the message encoded using a non-binary based encoding mechanism indicating that a remainder of the message is binary encoded. Thus, the method may further include decoding the first portion of the message using the non-binary based encoding mechanism and, if the message is a binary encoded message, then switching to binary decode the remainder of the message at operation 210. In an exemplary embodiment, the first portion of the message may be encoded using an ASCII based encoding mechanism such as UTF-8. The method may further include determining whether the message is a per call based message having per session based information removed at operation 220. In an exemplary embodiment, the determination as to whether the message is a per call based message may be made based on a message type field of one byte in length used to define the message type. In response to a determination that the message is the per call based message, the per call based message may be interpreted without the removed per session based information at operation 230. In an exemplary embodiment, the message received may be associated with a push-to-talk service.

Many modifications and other embodiments of the inventions set forth herein will come to mind to one skilled in the art to which these embodiments pertain having the benefit of the teachings presented in the foregoing descriptions and the associated drawings. For example, while embodiments have been described in conjunction with confirmation of registration in conjunction with the exchange of M-PTT messages, other embodiments of the present invention can be employed in conjunction with other services and/or the exchange of other types of messages. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for processing session related protocol signaling messages comprising:
receiving session related protocol signaling messages, wherein the session related protocol signaling messages are associated with a push-to-talk service protocol;
determining whether each received session related protocol signaling message is a per call based message or a per session based message, wherein the per call based message is used to establish a voice call;
in response to a determination that a first of the session related protocol signaling messages received at startup of a communication session is the per session based message, extracting per session based information and storing the extracted per session based information at a network node;
in response to a determination that a second of the session related protocol signaling messages received during the communication session between a mobile device and the network node is the per call based message, removing at least some per session based information from the per call based message to create a reduced per call based message;
indicating that a remainder of the reduced per call based message is binary encoded through a first portion of the reduced per call based message encoded using a non-binary based encoding mechanism; and
communicating the reduced per call based message to the network node to establish the voice call,
wherein the removed per session based information from the per call based message is redundant to the extracted per session based information and not needed in the reduced per call based message for establishing the voice call at the network node.

2. The method of claim 1, wherein the per session based message is a message containing per session based information that is exchanged between a mobile terminal and the network node following power up of the mobile terminal to establish the communication session between a mobile device and the network node.

3. The method of claim 2, wherein the per call based information includes some information that is redundant to the per session based information exchanged between the mobile terminal and the network node.

4. A computer program product for processing session related protocol signaling messages, the computer program product comprising at least one non-transitory computer-readable storage medium having computer-readable program code portions stored therein that when executed cause a processor to execute functions, the functions comprising:
receiving session related protocol signaling messages, wherein the session related protocol signaling messages are associated with a push-to-talk service protocol;
determining whether each received session related protocol signaling message is a per call based message or a per session based message, wherein the per call based message is used to establish a voice call;
in response to a determination that a first of the session related protocol signaling messages received at startup of a communication session is the per session based message, extracting per session based information and storing the extracted per session based information at a network node;
in response to a determination that a second of the session related protocol signaling messages received during the communication session between a mobile device and the network node
is the per call based message, removing at least some per session based information from the per call based message to form a reduced per call based message, wherein the removed per session based information is redundant and not needed to establish the call;
encoding, using a non-binary based encoding mechanism, a first portion of the reduced per call based message; and encoding a remainder of the reduced per call based message using a binary based encoding mechanism, wherein the non-binary encoding indicates that the remainder of the reduced per call based message is binary encoded.

5. An apparatus for processing session related protocol signaling messages, the apparatus comprising a simplification element comprising a processing device configured to:
receive session related protocol signaling messages, wherein the session related protocol signaling messages are associated with a push-to-talk service protocol;
determine whether each received session related protocol signaling message is a per call based message or a per session based message, wherein the per call based message is used to establish a voice call;
in response to a determination that a first of the session related protocol signaling messages received at startup of a communication session is the per session based message, extract per session based information and store the extracted per session based information at a network node;
in response to a determination that a second of the session related protocol signaling messages received during the communication session between a mobile device and the network node
is the per call based message, remove at least some per session based information from the per call based message to form a reduced per call based message, wherein the removed per session based information is redundant and not needed to establish the call;
encode, using a non-binary based encoding mechanism, a first portion of the reduced per call based message; and
encode a remainder of the reduced per call based message using a binary based encoding mechanism, wherein the non-binary encoding indicates that the remainder of the reduced per call based message is binary encoded.

6. An apparatus for processing session related protocol signaling messages, the apparatus comprising a simplification element comprising a processing device configured to:
receive session related protocol signaling messages, wherein the session related protocol signaling messages are associated with a push-to-talk service protocol;
determine whether each received session related protocol signaling message is a per call based message or a per session based message, wherein the per call based message is used to establish a voice call;
in response to a determination that a first of the session related protocol signaling messages received at startup of a communication session is the per session based message, extract per session based information and store the extracted per session based information at a network node;
in response to a determination that a second of the session related protocol signaling messages received during the communication session between a mobile device and the network node is the per call based message, remove at least some per session based information from the per call based message to create a reduced per call based message;
indicating that a remainder of the reduced per call based message is binary encoded through a first portion of the reduced per call based message encoded using a non-binary based encoding mechanism; and
communicating the reduced per call based message to the network node to establish the voice call,
wherein the removed per session based information from the per call based message is redundant to the extracted per session based information and not needed in the reduced per call based message for establishing the voice call at the network node.

7. The apparatus of claim 6, wherein the per session based message is a message containing per session based information that is exchanged between a mobile terminal and the network node following power up of the mobile terminal to establish the communication session between a mobile device and the network node.

8. The apparatus of claim 7, wherein the per call based information includes some information that is redundant to the per session based information exchanged between the mobile terminal and the network node.

9. A computer program product for processing session related protocol signaling messages, the computer program product comprising at least one non-transitory computer-readable storage medium having computer-readable program code portions stored therein that when executed cause a processor to execute functions, the functions comprising:
receiving session related protocol signaling messages, wherein the session related protocol signaling messages are associated with a push-to-talk service protocol;
determining whether each received session related protocol signaling message is a per call based message or a per session based message, wherein the per call based message is used to establish a voice call;
in response to a determination that a first of the session related protocol signaling messages received at startup of a communication session is the per session based message, extracting per session based information and storing the extracted per session based information at a network node;
in response to a determination that a second of the session related protocol signaling messages received during the communication session between a mobile device and the network node is the per call based message, removing at least some per session based information from the per call based message to create a reduced per call based message;
indicating that a remainder of the reduced per call based message is binary encoded through a first portion of the reduced per call based message encoded using a non-binary based encoding mechanism; and
communicating the reduced per call based message to the network node to establish the voice call,
wherein the removed per session based information from the per call based message is redundant to the extracted per session based information and not needed in the reduced per call based message for establishing the voice call at the network node.

10. The computer program product of claim 9, wherein the per session based message is a message containing per session based information that is exchanged between a mobile terminal and the network node following power up of the mobile terminal to establish the communication session between a mobile device and the network node.

11. The computer program product of claim 10, wherein the per call based information includes some information that is redundant to the per session based information exchanged between the mobile terminal and the network node.

* * * * *